US012763057B1

(12) United States Patent
Hasler et al.

(10) Patent No.: US 12,763,057 B1
(45) Date of Patent: Oct. 13, 2026

(54) RESONATOR HAVING A TUNED FLEXIBLE MEMBRANE

(71) Applicant: GE Vernova Infrastructure Technology LLC, Greenville, SC (US)

(72) Inventors: Cody Lee Hasler, Greenville, SC (US); Layal Hakim, Wurenlos (CH); Tyler Walton Kasperski, Greenville, SC (US); Sven Georg Bethke, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/244,446

(22) Filed: Jun. 20, 2025

(51) Int. Cl.
*G10K 11/16* (2006.01)
*F23R 3/02* (2006.01)
*G10K 11/172* (2006.01)

(52) U.S. Cl.
CPC .............. *G10K 11/161* (2013.01); *F23R 3/02* (2013.01); *G10K 11/172* (2013.01); *F23R 2900/00014* (2013.01); *G10K 2210/32272* (2013.01)

(58) Field of Classification Search
CPC ............. F23R 3/02; F23R 2900/00014; G10K 11/161; G10K 11/172
See application file for complete search history.

(56) References Cited

U.S. PATENT DOCUMENTS

| | | | | |
|---|---|---|---|---|
| 5,644,918 | A * | 7/1997 | Gulati | F23R 3/18 60/725 |
| 6,274,216 | B1 * | 8/2001 | Gonidec | B32B 5/02 428/116 |
| 6,351,947 | B1 * | 3/2002 | Keller | F23M 20/005 60/725 |
| 6,530,221 | B1 * | 3/2003 | Sattinger | F23M 20/005 60/725 |
| 6,837,051 | B2 * | 1/2005 | Mandai | F23R 3/06 60/725 |
| 8,469,141 | B2 * | 6/2013 | Wang | F23M 20/005 244/1 N |
| 8,733,496 | B2 * | 5/2014 | Ono | F23R 3/06 181/213 |
| 8,973,365 | B2 | 3/2015 | Corr et al. | |
| 10,724,739 | B2 | 7/2020 | Kim et al. | |
| 11,514,878 | B2 | 11/2022 | Semperlotti et al. | |
| 2014/0311156 | A1 | 10/2014 | Tretyakov et al. | |

OTHER PUBLICATIONS

Sanada et al., "Extension of the frequency range of resonant sound absorbers using two-degree-of-freedom Helmholtz-based resonators with a flexible panel", Applied Acoustics, vol. 74, 2013, pp. 509-516. (Year: 2013).*

* cited by examiner

*Primary Examiner* — Lorne E Meade
(74) *Attorney, Agent, or Firm* — Dority & Manning, P.A.

(57) ABSTRACT

A resonator for a combustor is provided. The resonator includes an outer body that partially defines a first chamber and one or more outer apertures configured to convey a first fluid between an outer fluid plenum and the first chamber. The resonator further includes an inner body that partially defines a second chamber and one or more inner apertures configured to convey a second fluid between the second chamber and a combustion chamber. The resonator further includes a flexible membrane that is disposed between the inner body and the outer body and partitioning the first chamber and the second chamber.

20 Claims, 6 Drawing Sheets

RESONATOR HAVING A TUNED FLEXIBLE MEMBRANE

FIELD

The present disclosure relates generally to a resonator having a flexible membrane. More specifically, the present disclosure generally relates to a resonator having a flexible membrane for reducing combustion dynamics in a gas turbine combustor.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Various operating parameters such as fuel temperature, fuel composition, ambient operating conditions and/or operational load on the turbomachine may result in combustion dynamics or pressure pulses within the combustion section. Combustion dynamics is a result of interaction between heat release from combusting fuel-air mixture and pressure oscillations in the combustion chamber. These dynamic pressure waves may range in frequency from a few hertz to several thousand hertz. Combustion dynamics in the form of fluctuations in pressure, heat-release rate, and other perturbations in flow may lead to problems such as structural vibration and/or excessive heat transfer to a component. In some instances, the pressure pulses can result in mechanical damage to combustor and turbine components and smothering of the flame in the combustor (referred to as a "lean blow-out").

Accordingly, there is a need for improved system to reduce combustion dynamics. As may be appreciated, mitigating combustion dynamics can advantageously increase the operational flexibility of the gas turbine engine.

BRIEF DESCRIPTION

Aspects and advantages of the resonators and combustors in accordance with the present disclosure will be set forth in part in the following description, or may be obvious from the description, or may be learned through practice of the technology.

In accordance with one embodiment, a resonator for a combustor is provided. The resonator includes an outer body that partially defines a first chamber and one or more outer apertures configured to convey a first fluid between an outer fluid plenum and the first chamber. The resonator further includes an inner body that partially defines a second chamber and one or more inner apertures configured to convey a second fluid between the second chamber and a combustion chamber. The resonator further includes a flexible membrane that is disposed between the inner body and the outer body and partitioning the first chamber and the second chamber.

In accordance with another embodiment, a combustor is provided. The combustor includes a combustion liner that defines a combustion chamber. The combustor further includes an outer sleeve that is spaced apart from the combustion chamber such that an annulus is positioned between the outer sleeve and the combustion chamber. The combustor further includes one or more resonators that are positioned in the annulus and fluidly connected to the combustion chamber. At least one of the one or more resonators includes an outer body that partially defines a first chamber and one or more outer apertures configured to convey a first fluid between an outer fluid plenum and the first chamber. The resonator further includes an inner body that partially defines a second chamber and one or more inner apertures configured to convey a second fluid between the second chamber and the combustion chamber. The resonator further includes a flexible membrane that is disposed between the inner body and the outer body and partitioning the first chamber and the second chamber.

These and other features, aspects and advantages of the present resonators and combustors will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present resonators and combustors, including the best mode of making and using the present systems and methods, directed to one of ordinary skill in the art, is set forth in the specification, which makes reference to the appended figures, in which.

DETAILED DESCRIPTION

Figure 1:
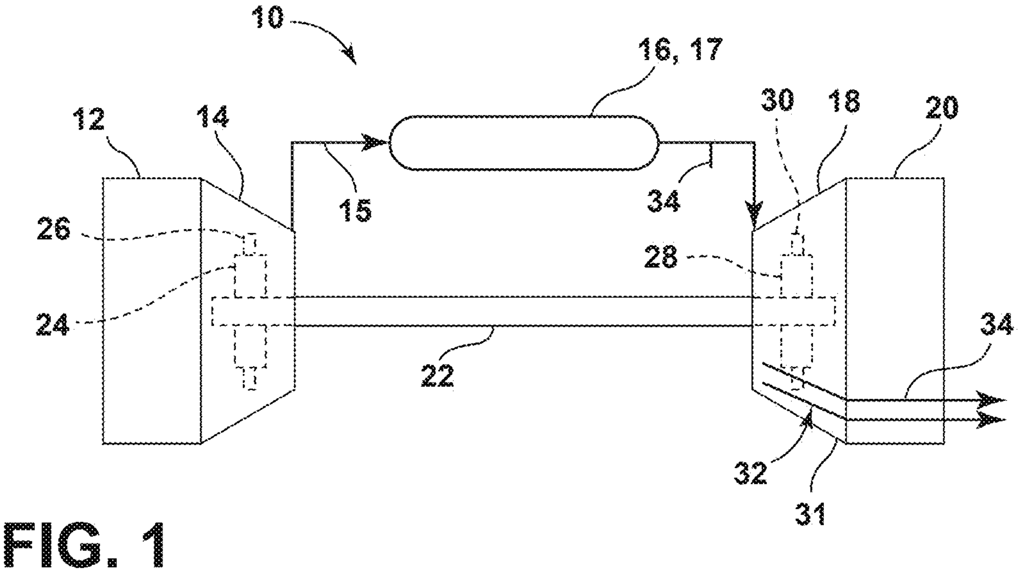
FIG. 1 is a schematic illustration of a turbomachine in accordance with embodiments of the present disclosure.

Reference now will be made in detail to embodiments of the present resonators and combustors, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine engine 10. Although an industrial or land-based gas turbine is shown and described herein, the present disclosure is not limited to an industrial or land-based gas turbine engine unless otherwise specified in the claims. For example, the technology as described herein may be used in any type of turbomachine including but not limited to a steam turbine, an aircraft gas turbine, or a marine gas turbine.

As shown, gas turbine engine 10 generally includes an inlet section 12, a compressor section 14 disposed downstream of the inlet section 12, a plurality of combustors 17 (shown in FIG. 2) within a combustion section 16 disposed downstream of the compressor section 14, a turbine section 18 disposed downstream of the combustion section 16, and an exhaust section 20 disposed downstream of the turbine section 18. Additionally, the gas turbine engine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form an upstream portion of the shaft 22 that extends through the compressor section 14. The compressor section 14 further includes a plurality of stationary vanes (not shown), which are arranged in stages with the rotor blades 26 and which direct the flow against the rotor blades 26.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a downstream portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18. The turbine section 18 further includes a plurality of stationary vanes (not shown), which are arranged in stages with the rotor blades 30 and which direct the flow against the rotor blades 30.

During operation, a working fluid such as air flows through the inlet section 12 and into the compressor section 14 where the air is progressively compressed by multiple compressor stages of rotating blades and stationary vanes, thus providing pressurized air to the combustors 17 of the combustion section 16. The pressurized air is mixed with fuel and burned within each combustor 17 to produce combustion gases 34. The combustion gases 34 flow through the hot gas path 32 from the combustion section 16 into the turbine section 18, in which energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine engine 10 via the exhaust section 20.

Figure 2:
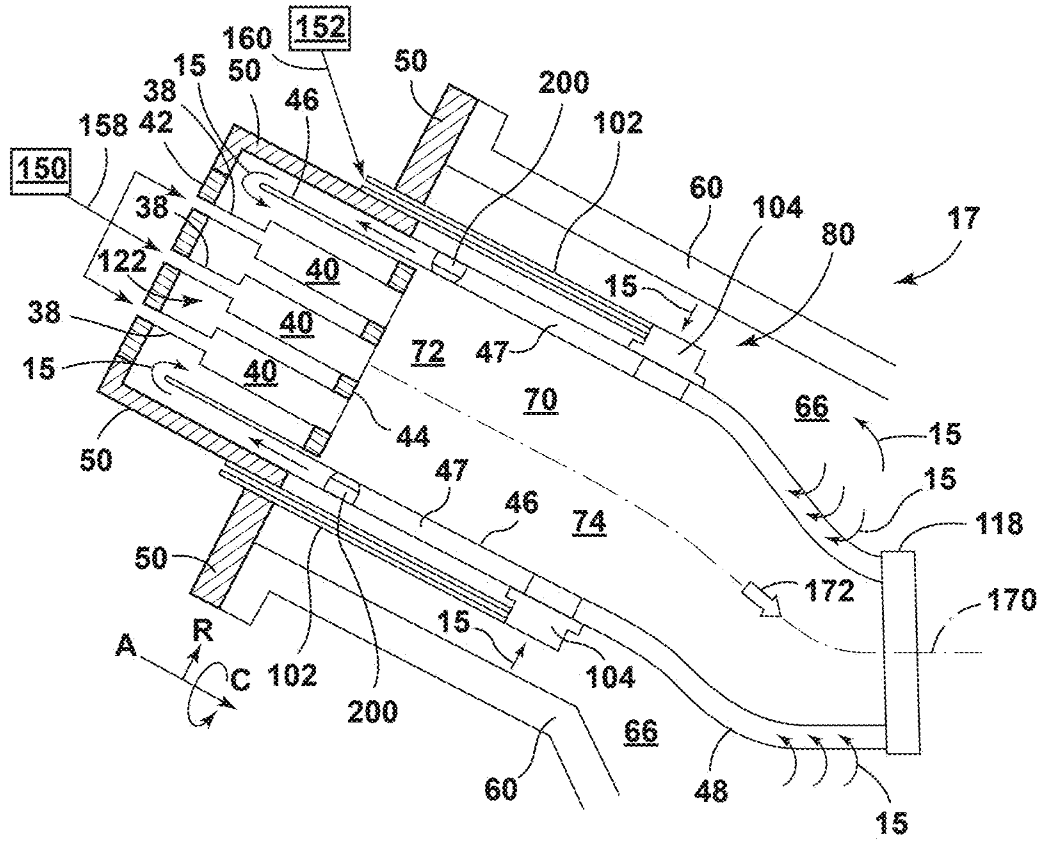
FIG. 2 illustrates a cross-sectional view of a combustor in accordance with embodiments of the present disclosure, as may be used with the turbomachine of FIG. 1.

FIG. 2 is a schematic representation of a combustor 17, as may be included in a can-annular combustion system 16 for the gas turbine engine 10. In a can annular combustion system, a plurality of combustors 17 (e.g., 8, 10, 12, 14, 16, or more) are positioned in an annular array about the shaft 22 that connects the compressor section 14 to the turbine section 18.

As shown in FIG. 2, the combustor 17 may define an axial direction A that extends along an axial centerline 170. The combustor 17 may also define a circumferential direction C which extends around the axial direction A and the axial centerline 170. The combustor 17 may further define a radial direction R perpendicular to the axial direction A and the axial centerline 170.

As shown in FIG. 2, the combustor 17 includes a combustion liner 46 that defines a combustion chamber 70. The combustion liner 46 may be positioned within (i.e., circumferentially surrounded by) an outer sleeve 48, such that an annulus 47 is formed therebetween. The combustion liner 46 may contain and convey combustion gases to the turbine section 18. The combustion liner 46 defines the combustion chamber 70 within which combustion occurs. As shown in FIG. 2, the combustion liner 46 may extend between fuel nozzles 40 and an aft frame 118. The combustion liner 46 may have a generally cylindrical liner portion and a tapered transition portion that is separate from the generally cylindrical liner portion, as in many conventional combustion systems. Alternately, the combustion liner 46 may have a unified body (or "unibody") construction, in which the generally cylindrical portion and the tapered portion are integrated with one another. Thus, any discussion of the combustion liner 46 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine section 18 are integrated into a single unit (e.g., without aft frame 118), sometimes referred to as a "transition nozzle" or an "integrated exit piece."

FIG. 2 illustrates a combustor 17 having both fuel nozzles 40 and one or more fuel injection assemblies 80 (also referred to as an axial fuel staging (AFS) system), as discussed further herein. The at least one fuel nozzle 40 may be positioned at the forward end of the combustor 17. Fuel may be directed through fuel supply conduits 38, which extend through an end cover 42, and into the fuel nozzles 40. The fuel nozzles 40 convey the fuel and compressed air 15 into a primary combustion zone 72, where combustion occurs. In some embodiments, the fuel and compressed air 15 are combined as a mixture prior to reaching the primary combustion zone 72.

The combustion liner 46 may be surrounded by an outer sleeve 48, which is spaced radially outward of the combustion liner 46 to define an annulus 47 through which compressed air 15 flows to a forward, or head, end of the combustor 17. For example, compressed air 15 may enter the annulus 47 through the outer sleeve 48 (e.g., through impingement holes proximate the aft frame 118) and travel towards the end cover 42, such that the compressed air 15 within the annulus 47 flows opposite the direction of combustion gases 172 (34 in FIG. 1) within the combustion liner 46. Heat is transferred convectively from the combustion liner 46 to the compressed air 15, thus cooling the combustion liner 46 and warming the compressed air 15.

In some embodiments, the outer sleeve 48 may include a flow sleeve and an impingement sleeve coupled to one another. The flow sleeve may be disposed at the forward end, and the impingement sleeve may be disposed at the aft end. Alternately, the outer sleeve 48 may have a unified body (or "unisleeve") construction, in which the flow sleeve and the impingement sleeve are integrated with one another in the axial direction. As before, any discussion of the outer sleeve 48 herein is intended to encompass both conventional combustion systems having a separate flow sleeve and impingement sleeve and combustion systems having a unisleeve outer sleeve.

The forward casing 50 and the end cover 42 of the combustor 17 define the head end air plenum 122, which includes the one or more fuel nozzles 40. As discussed below, the fuel nozzles 40 may be bundled tube fuel nozzles. The fuel nozzles 40 may be positioned within the head end air plenum 122 defined at least partially by the forward casing 50. In many embodiments, the fuel nozzles 40 may extend from the end cover 42. For example, each fuel nozzle 40 may be coupled to an aft surface of the end cover 42 via a flange. As shown in FIG. 2, the at least one fuel nozzle 40 may be partially surrounded by the combustion liner 46 or a cylindrical inlet flow conditioner (not separately labeled). The aft, or downstream ends, of the fuel nozzles 40 extend through or collectively define a cap plate 44 that defines the upstream end of the combustion chamber 70.

The fuel nozzles 40 may be in fluid communication with a first fuel supply 150 configured to supply a first fuel 158 to the fuel nozzles 40. In many embodiments, the first fuel 158 may be a fuel mixture containing natural gas (such one or more of as methane, ethane, propane, or other suitable natural gas) and hydrogen. In other embodiments, the first fuel 158 may be pure natural gas or pure hydrogen (e.g., 100% hydrogen, which may or may not contain some trace amount of contaminants), such that the first fuel is not a mixture of multiple fuels. In other embodiments, the first fuel 158 may be a mixture of hydrogen and natural gas, where hydrogen is the majority component (i.e., greater than 50%). In exemplary embodiments, the first fuel 158 and compressed air 15 may mix together within the fuel nozzles 40 to form a first mixture of compressed air 15 and the first fuel 158 before being ejected (or injected) by the fuel nozzles 40 into the primary combustion zone 72.

The forward casing 50 may be fluidly and mechanically connected to a compressor discharge casing 60, which defines a high pressure plenum 66 around the combustion liner 46 and the outer sleeve 48. Compressed air 15 from the compressor section 14 travels through the high pressure plenum 66 and enters the combustor 17 via apertures (not shown) in the downstream end of the outer sleeve 48 (as indicated by arrows near the aft frame 118). Compressed air 15 travels upstream through the annulus 47 and is turned by the end cover 42 to enter the fuel nozzles 40 and to cool the head end. In particular, compressed air 15 flows from high pressure plenum 66 into the annulus 47 at an aft end of the combustor 17, via openings defined in the outer sleeve 48. The compressed air 15 travels upstream from the aft end of the combustor 17 to the head end air plenum 122, where the compressed air 15 reverses direction and enters the fuel nozzles 40.

In the exemplary embodiment, one or more fuel injection assemblies 80 are provided to deliver a second fuel/air mixture to a secondary combustion zone 74 downstream from the primary combustion zone 72. For example, a second flow of fuel 160 and air 15 may be introduced by one or more fuel injectors 104 to the secondary combustion zone 74.

The primary combustion zone 72 and the secondary combustion zone 74 may each be portions of the combustion chamber 70 and therefore may be defined by the combustion liner 46. For example, the primary combustion zone 72 may be defined from an outlet of the fuel nozzles 40 to the fuel injector 104, and the secondary combustion zone 74 may be defined from the fuel injector 104 to the aft frame 118. In this arrangement, the forwardmost boundary of the fuel injector 104 may define the end of the primary combustion zone 72 and the beginning of the secondary combustion zone 74 (e.g., at an axial location where a second flow of fuel and air are introduced).

A fuel supply conduit 102 may fluidly couple to the fuel injector 104. The fuel injector 104 may be in fluid communication with a second fuel supply 152 configured to supply a second fuel 160 to the fuel injector 104 via the fuel supply conduit 102. The second fuel supply 152 may be the same or different than the first fuel supply 150, such that the fuel injector 104 may be supplied with the same fuel or a different fuel than the fuel nozzles 40. In many embodiments, the second fuel 160 may be a fuel mixture containing natural gas (such as one or more of methane, ethane, propane, or other suitable natural gas) and hydrogen. In other embodiments, the second fuel 160 may be pure natural gas or pure hydrogen (e.g., 100% hydrogen, which may or may not contain some trace amount of contaminants), such that the first fuel is not a mixture of multiple fuels. In other embodiments, the second fuel 160 may be a mixture of hydrogen and natural gas, where hydrogen is the majority component (i.e., greater than 50%). In exemplary embodiments, the second fuel 160 and compressed air 15 may mix together within the fuel injector 104 to form a mixture of compressed air 15 and the second fuel 160 before being injected through the fuel injector 104 and into the combustion chamber 70 and, more specifically, into the secondary combustion zone 74.

As shown in FIG. 2, the combustor 17 may further include one or more resonators 200 positioned aft of the fuel nozzles 40 and/or the cap plate 44 with respect to the flow of combustion gases 172. Specifically, the one or more resonators 200 may be connected to at least one of the outer sleeve 48 and/or the combustion liner 46. The one or more resonators may be positioned in the annulus 47 (e.g., between the outer sleeve 48 and the combustion liner 46). The one or more resonators 200 may be fluidly connected to at least one of the combustion chamber 70 (e.g., the primary combustion chamber 72 in exemplary embodiments), the high pressure plenum 66, and the annulus 47. In some embodiments (not shown), the one or more resonators 200 may include a plurality of resonators 200 arranged circumferentially about the centerline 170 of the combustor 17 (e.g., in a full circumferential ring or partial circumferential ring). The one or more resonators 200 may advantageously manage and/or reduce combustion instabilities, including pressure oscillations that could otherwise cause damage to the combustor 17. The resonators 200 may advantageously be capable of tuning higher frequency tones associated with operation of the combustor 17 on high amounts of hydrogen, which enables such operation while preventing potential damage-causing pressure oscillations.

Figure 3:
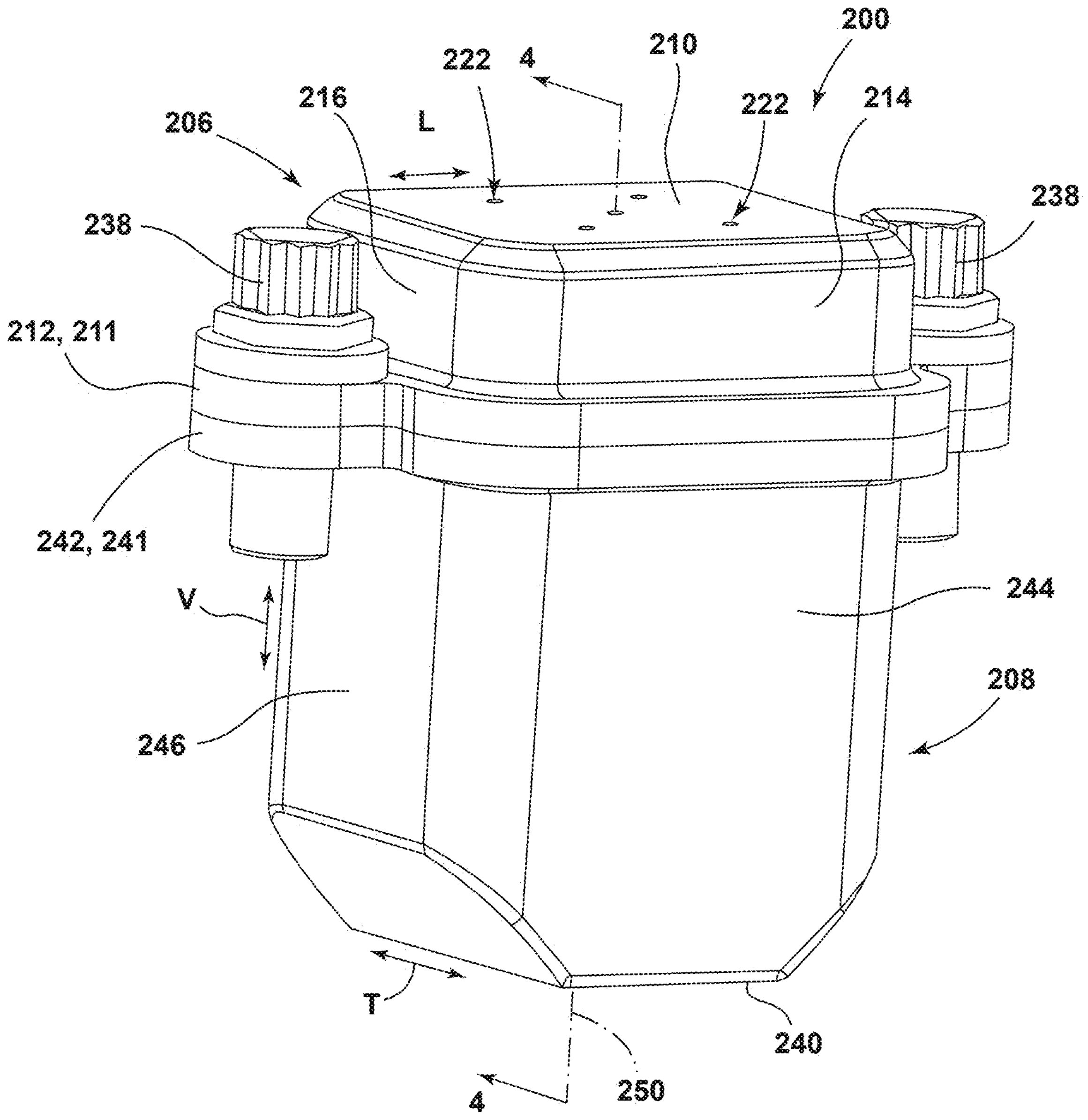
FIG. 3 illustrates a perspective view of a resonator that may be included in the combustor of FIG. 2 in accordance with embodiments of the present disclosure.
Figure 4:
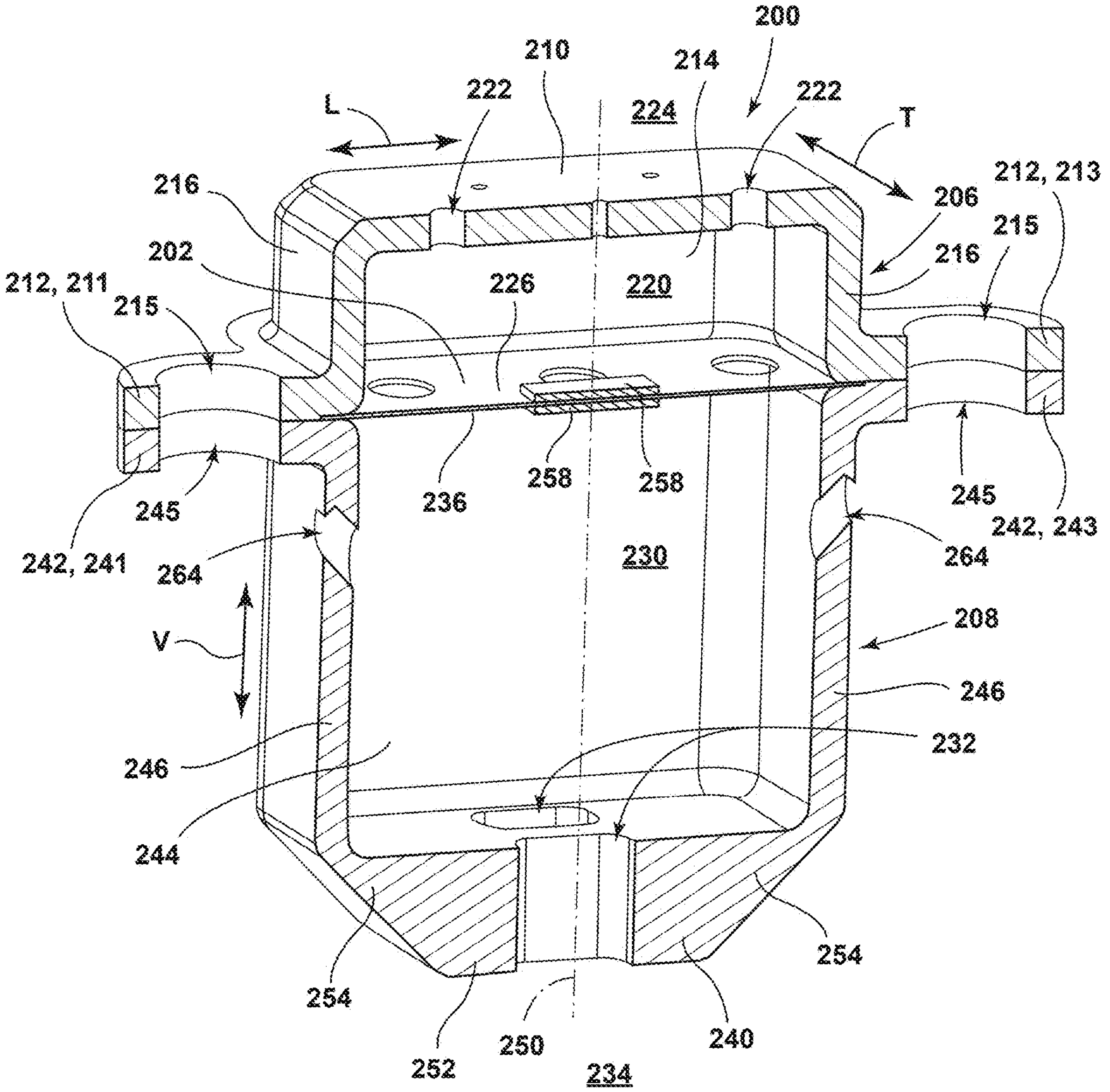
FIG. 4 illustrates a perspective cross-sectional view of the resonator shown in FIG. 3 from along the line 4-4 in accordance with embodiments of the present disclosure.
Figure 5B:
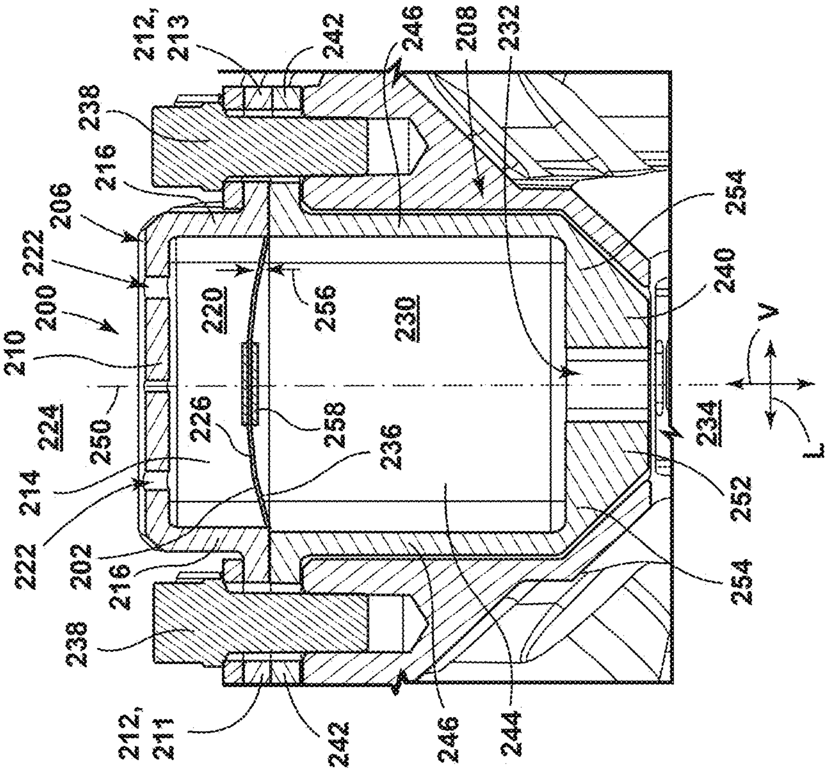
FIG. 5B illustrates a cross-sectional planar view of a resonator installed in a combustor, in which a flexible membrane of the resonator is in a radially outermost position, in accordance with exemplary aspects of the present disclosure.
Figure 5A:
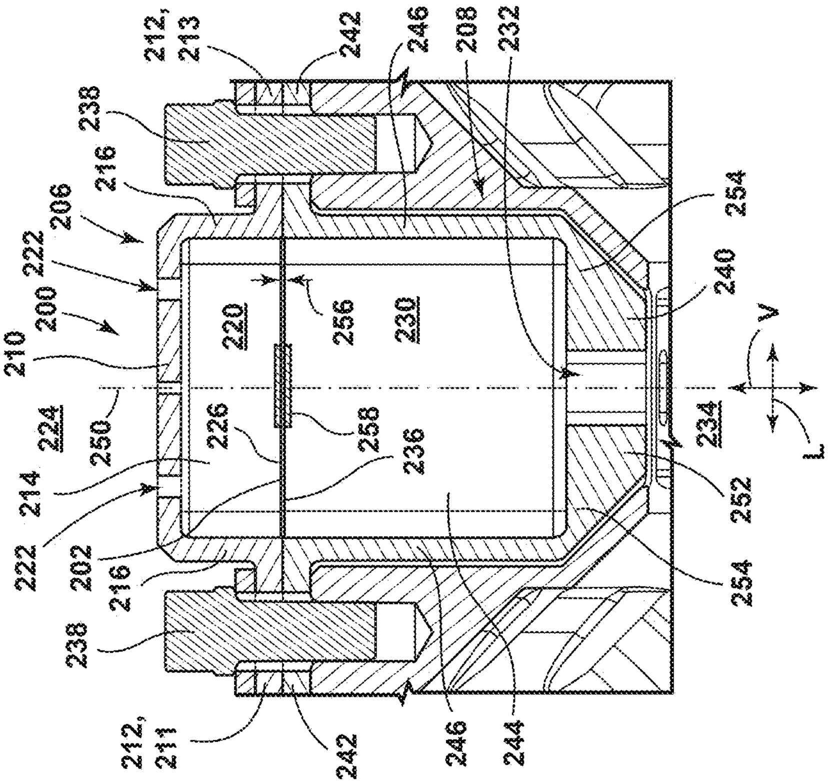
FIG. 5A illustrates a cross-sectional planar view of a resonator installed in a combustor, in which a flexible membrane of the resonator is in a resting position, in accordance with exemplary aspects of the present disclosure.
Figure 6:
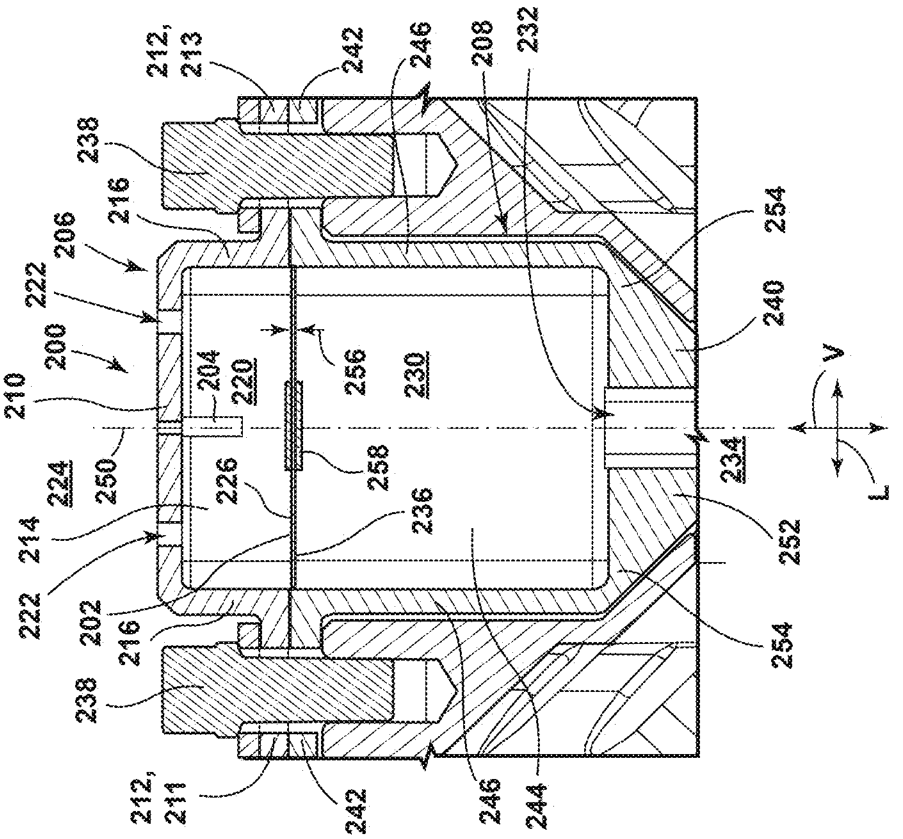
FIG. 6 illustrates a planar cross-sectional view of a resonator installed in a combustor that includes an amplitude limiter in accordance with embodiments of the present disclosure.
Figure 7:
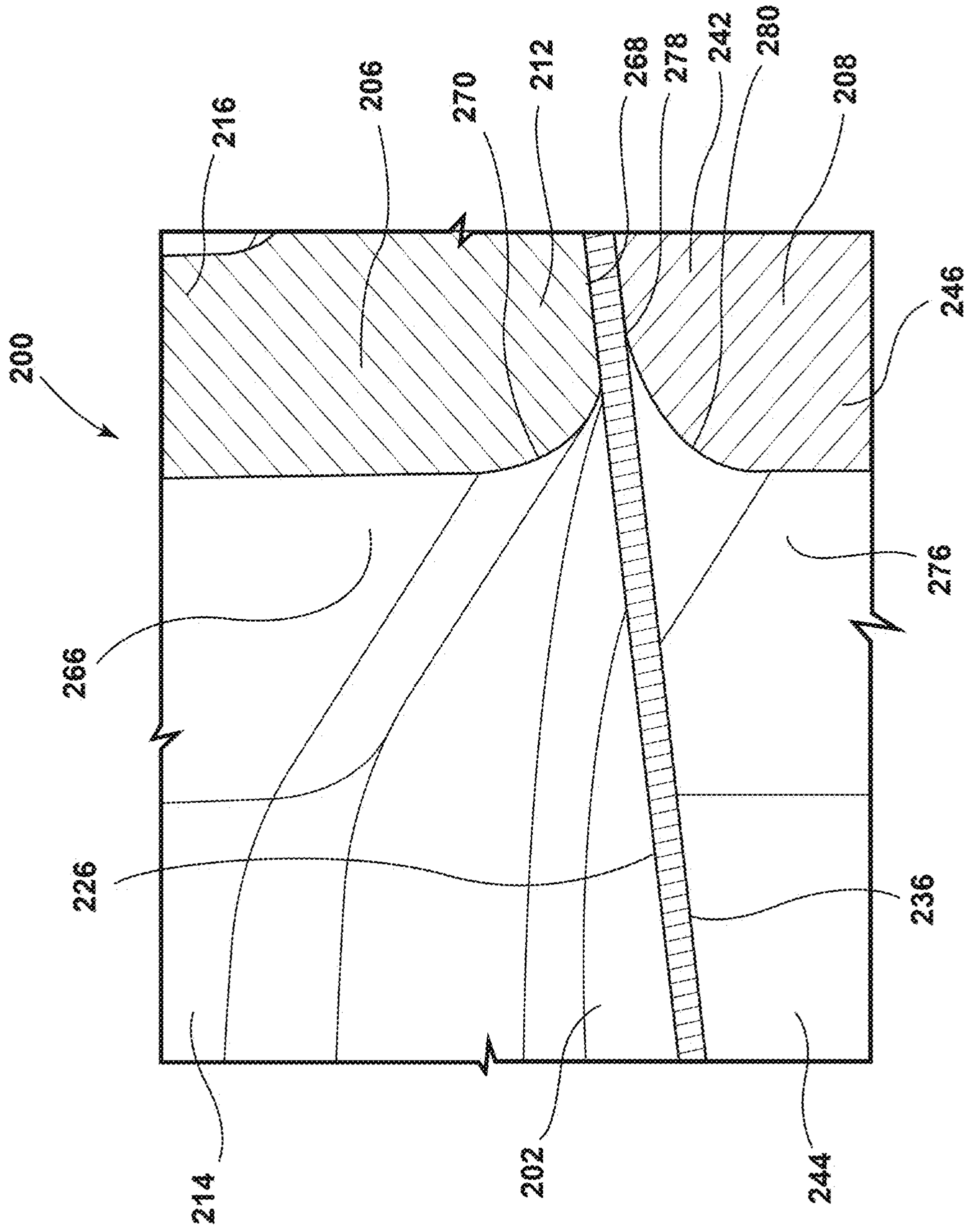
FIG. 7 illustrates an enlarged cross-sectional view of a resonator in accordance with embodiments of the present disclosure.

Referring now to FIGS. 3 through 7, various views of a resonator 200 for a combustor 17 are illustrated in accordance with embodiments of the present disclosure. Specifically, FIG. 3 illustrates a perspective view of a resonator 200 in accordance with embodiments of the present disclosure. FIG. 4 illustrates a perspective cross-sectional view of the resonator 200 from along the line 4-4 shown in FIG. 3. FIGS. 5A-5C illustrates a cross-sectional planar view of the resonator 200 installed in a combustor 17, in which a flexible membrane 202 of the resonator 200 is in three different positions, e.g., a resting position (FIG. 5A), a radially outermost position (FIG. 5B), and a radially innermost position (FIG. 5C). FIG. 6 illustrates a planar cross-sectional view of a resonator 200 installed in a combustor 17 that includes an amplitude limiter 204. FIG. 7 illustrates an enlarged view of a junction between the an outer body 206, an inner body 208, and the flexible membrane 202 of the resonator 200 in accordance with exemplary aspects of the present disclosure.

As shown, the resonator 200 may define an axial centerline 250 and a mutually orthogonal coordinate system relative to the axial centerline 250. For example, a vertical direction V may extend along the axial centerline 250, a transverse direction T may extend perpendicular to the axial centerline 250 and the vertical direction V, and a longitudinal direction L may extend perpendicular to the vertical direction V, the transverse direction T, and the axial centerline 250.

In exemplary embodiment, the resonator 200 includes the outer body 206, the inner body 208, and the flexible membrane 202. The flexible membrane 202 may be disposed between the outer body 206 and the inner body 208. The outer body 206 may partially define a first chamber 220 and one or more outer apertures 222 configured to convey a first fluid between an outer fluid plenum 224 and the first chamber 220. Specifically, the outer body 206 and an outer surface 226 of the flexible membrane 202 may collectively define the first chamber 220. The inner body may partially define a second chamber 230 and one or more inner apertures 232 configured to convey a second fluid between the second chamber 230 and a combustion chamber 234. Specifically, the inner body 208 and an inner surface 236 of the flexible membrane 202 may collectively define the second chamber 230.

The outer body 206 may include an outer wall 210, an outer flange 212, at least one outer side wall 214 (e.g., two outer side walls), and outer end walls 216. In some embodiments, (not shown) the outer body 206 may be cylindrically shaped, such that the outer body 206 only includes one side wall 214. In the embodiment shown, the outer body 206 may be shaped generally as a polygonal prism, such that the outer body 206 includes several side walls and end walls. The outer wall 210 may extend generally within the longitudinal-transverse plane between the outer side walls 214 and the outer end walls 210. Specifically, the outer wall 210 may be generally shaped as a rectangular prism with a length in the longitudinal direction L, a width in the transverse direction T, and a thickness in the vertical direction V. The outer side walls 214 may each extend vertically between the outer wall 210 and the outer flange 212. Similarly, the outer end walls 216 may each extend vertically between the outer wall 210 and the outer flange 212.

The outer side walls 214 and the outer end walls 216 may extend generally perpendicularly to the outer wall 210. Additionally, the outer side walls 214 and the outer end walls 216 may extend generally perpendicularly to each other. For example, the outer end walls 216 may be generally parallel to one another and may each extend (e.g., transversely) between the outer side walls 214. Similarly, the outer side walls 214 may be generally parallel to one another and may each extend (e.g., longitudinally) between the outer end walls 216.

The outer flange 212 may extend generally perpendicularly from the outer side walls 214 and the outer end walls 216. The outer flange 212 may extend away from the first chamber 220 in both the longitudinal direction L and the transverse direction T. For example, the outer flange 212 may extend generally longitudinally from the end walls 216 away from the first chamber 220, and the outer flange 212 may extend transversely from the side walls 214 away from the chamber 220. For example, the outer flange 212 may include outer bolt portions 211, 213 extending (e.g., longitudinally) from the end walls 216. For example, a first outer bolt portion 211 may extend longitudinally from the a first outer end wall 216, and a second outer bolt portion 213 may extend longitudinally from a second outer end wall 216. The outer bolt portions 211, 213 may each define an outer bolt hole 215 that is configured to receive a bolt 238.

The inner body 208 may include an inner wall 240, an inner flange 242, at least one inner side wall 244 (e.g., two inner side walls 244), and inner end walls 246. In some embodiments, (not shown) the inner body 208 may be cylindrically shaped, such that the inner body 208 only includes one side wall 244. In the embodiment shown, the inner body 208 may be shaped generally as a polygonal prism, such that the inner body 208 includes several side walls and end walls. The inner wall 240 may include a main portion 252 and converging portions 254. The main portion 252 may extend between the converging portions 254 and may have a generally constant thickness in the vertical direction V. The converging portions 254 may each extend between the main portion 252 and a respective side wall 246. The converging portions 254 may each converge in vertical thickness as the converging portions 254 extend longitudinally from the main portion 252 to the respective side wall 246. For example, each of the converging portions 254 may define a slanted exterior surface, which may be slanted or sloped with respect to the vertical direction V and the longitudinal direction L.

The inner side walls 244 may each extend vertically between the inner wall 240 and the inner flange 242. Similarly, the inner end walls 246 may each extend vertically between the inner wall 240 and the inner flange 242. Specifically, the inner end walls 246 may each extend generally vertically between one of the converging portions 254 of the inner wall 240 and the inner flange 242. The inner side walls 244 and the inner end walls 246 may each extend from the inner wall 240 to the inner flange 242. The inner side walls 244 and the inner end walls 246 may extend generally perpendicularly to each other. For example, the inner end walls 246 may be generally parallel to one another and may each extend (e.g., transversely) between the inner side walls 244. Similarly, the inner side walls 244 may be generally parallel to one another and may each extend (e.g., longitudinally) between the inner end walls 246.

The inner flange 242 may extend generally perpendicularly from the inner side walls 244 and the inner end walls 246. The inner flange 242 may extend away from the second chamber 230 in both the longitudinal direction L and the transverse direction T. For example, the inner flange 242 may extend generally longitudinally from the end walls 246 away from the second chamber 230, and the inner flange 242 may extend transversely from the side walls 244 away from the second chamber 230. For example, the inner flange 242 may include inner bolt portions 241, 243 extending (e.g., longitudinally) from the end walls 246. For example, a first inner bolt portion 241 may extend longitudinally from the a first inner end wall 246, and a second inner bolt portion 243 may extend longitudinally from a second inner end wall 246. The inner bolt portions 241, 243 may each define an inner bolt hole 245 that is configured to receive a bolt 238. That is, each of the inner bolt holes 245 may align with a respective outer bolt hole 215, and a bolt 238 may extend through both the inner bolt hole 215 and the outer bolt hole 245 to couple the outer body 206 to the inner body 208.

The outer apertures 222 may be defined in the outer wall 210 of the outer body 206. The outer apertures 222 may extend generally vertically to fluidly couple the outer fluid plenum 224 to the outer chamber 220. The outer apertures 222 may have a generally circularly shaped cross sectional shape, and the outer apertures 222 may be spaced apart from the centerline axis 250 (e.g., equally spaced apart or unequally spaced apart). Additionally, as shown in FIG. 4, in some embodiments, the at least one inner side wall 246 may define one or more side apertures 264. The side apertures 264 may be angled relative to the axial centerline 250 of the resonator 200.

The inner apertures 232 may be defined in the inner wall 240 of the inner body 208. The inner apertures 232 may be a variety of shapes, such as circular, elliptical, polygonal, or other shapes, and the present disclosure should not be limited to any particular shape of aperture unless specifically recited in the claims. Specifically, the inner apertures 232 may be defined in the main portion 252 of the inner wall 240 and may extend generally vertically through the inner wall 240 to fluidly connect the combustion chamber 234 and the inner chamber 230. At least one inner aperture 234 may be disposed along the axial centerline 250. The inner apertures 232 may be generally slot or stadium shaped (e.g., a rectangle having circular ends). For example, each of the inner apertures 232 may extend along a major axis (e.g., the longest dimension of the inner aperture 232) and a minor axis (e.g., the smallest dimension of the inner aperture 232) that is perpendicular to the major axis. The major axis may be parallel to the longitudinal direction L, and the minor axis may be parallel to the transverse direction T. In this way, each of the inner apertures 232 may be elongated (or longest) along the longitudinal direction L and shortest along the transverse direction T. The inner apertures 232 may be spaced apart from one another with respect to the transverse direction T.

As mentioned above, the flexible membrane 202 may be disposed between the inner body 208 and the outer body 200. The flexible membrane 202 may partition (i.e., separate and partially define) the first chamber 220 and the second chamber 230. The flexible membrane 202 may be “thin” such that a thickness 256 (e.g., vertical dimension) is much smaller (e.g., 1/10 or smaller) than a length (e.g., longitudinal dimension) and/or a width (e.g., transverse direction). Specifically, the thickness 256 may be between about 0.010 inches and about 0.0125 inches. The flexible membrane 202 may be composed of a metal material, which is advantageously resilient to the high temperatures of the combustion chamber 234.

Figure 5C:
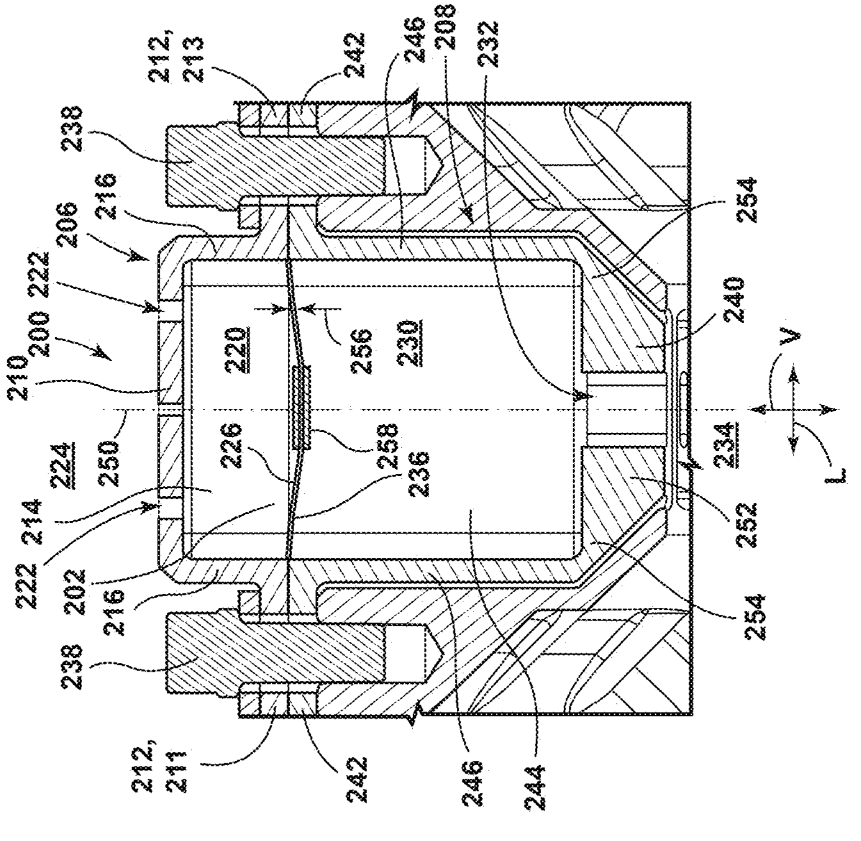
FIG. 5C illustrates a cross-sectional planar view of a resonator installed in a combustor, in which a flexible membrane of the resonator is in a radially innermost position, in accordance with exemplary aspects of the present disclosure.

Referring specifically to FIGS. 5A-5C, the flexible membrane 202 may be movable (e.g., flexible) between an outermost position (FIG. 5B) in the first chamber 220 (or in the outer body 206) and an innermost position (FIG. 5C) in the second chamber 230 (or in the inner body 208) from a resting position (FIG. 5A) between the inner body 208 and the outer body 206. That is, the flexible membrane 202 may be compliant or flexible (i.e., not rigid) such that the flexible membrane 202 is able to bend, deform, or yield under a force load without breaking and subsequently return to its original (i.e., resting) state. In this way, the flexible membrane 202 may oscillate (or rapidly move between the outermost position and the innermost position) in response to pressure oscillations from the combustion chamber 234, which advantageously dampens the pressure oscillations from the combustion chamber 234.

In the embodiments depicted, the first chamber 220 may define a smaller volume than the second chamber 230. However, in other embodiments (not shown), the first chamber 220 may define a larger volume 220 than the second chamber 230. In yet still further embodiments, the first chamber 220 may define a volume that is approximately equal to a volume of the second chamber 230 (e.g., within ±10%).

In exemplary embodiments, a mass damper 258 may be coupled to the flexible membrane 202. The mass damper 258 advantageously allow the flexible membrane 202 to be tuned to one or more target frequencies of combustion dynamics to dampen such frequencies in the combustion chamber 234. In some embodiments, the mass damper 258 may be a constant or uniform thickness to tune the flexible membrane 202. In other embodiments, the mass damper 258 may have a varying thickness to tune the flexible membrane 202 as desired. The damper mass 258 may include a variety of cross-sectional shapes (such as circular, elliptical, polygonal, or other shapes), and the present disclosure should not be limited to any particular cross-sectional shape unless specifically recited in the claims. As shown, the mass damper 258 may include a first mass damper 258 affixed to the outer surface 226 of the flexible membrane 202 and a second mass damper 258 affixed to the inner surface 236 of the flexible membrane. The first and second mass dampers 258 may be the same size, weight, and may be aligned with one another (e.g., with respect to the vertical direction V, the transverse direction T, and the longitudinal direction L).

In many embodiments, as shown, the mass damper 258 may be positioned along the axial centerline 250. However, in other embodiments (not shown), the mass damper 258 may be spaced apart from the axial centerline 250. For example, in some embodiments (not shown), a plurality of mass dampers 258 may be affixed to the flexible membrane 202, spaced apart from the axial centerline 250, and collectively surrounding the axial centerline 250.

In many embodiments, a single mass damper 258 may be coupled to the flexible membrane 202 at a single point to obtain the proper damping at the desired frequencies. However, in other embodiments, a plurality of mass dampers 258 may be coupled to the flexible membrane 202 and arranged in a pattern (or randomly) to properly tune the flexible membrane 202 at the desired frequencies. In such embodiments, each of the mass dampers 258 in the plurality of mass dampers 258 may be a formed from a different material (such that the mass dampers have a different density). In exemplary embodiments, the mass damper(s) 258 may be formed from a thermally resistant material (such as metal or ceramic) that can withstand the high temperatures of the combustion chamber without melting.

Referring collectively to FIGS. 2-7, briefly, the combustor 17 may include a plurality of resonators 200 each having a flexible membrane 202 with a mass damper 258 tuned to a different target frequency of the combustion chamber 70. For example, the combustor 17 may include a first resonator 200 having a first flexible membrane 202 with a first mass damper 258 tuned (i.e., sized and weighted) to a first target frequency and a second resonator 200 having a second flexible membrane 202 with a second mass damper 258 tuned (i.e., sized and weighted) to a second target frequency. This allows the resonators 200 to collectively manage and reduce pressure oscillations within the combustion chamber 70 at a variety of target frequencies.

As shown in FIG. 4, the flexible membrane may define one or more openings 260 that fluidly couple the first chamber 220 and the second chamber 230. In this way, fluid may pass between the first chamber 220 and the second chamber 230 via the openings 260. The openings 260 may be spaced apart from one another and arranged on the flexible membrane 202. The openings 260 may be arranged in a pattern or randomly (e.g., not following any repeated pattern). The openings 260 may each be circularly shaped, but it should be appreciated that other shapes are possible (e.g., rectangularly shaped, triangle shaped, elliptically shaped, stadium shaped, slot shaped, or other shapes). The openings 260 may be spaced apart from one another (e.g., equally or unequally spaced apart) in the longitudinal direction L and/or the transverse direction T. The openings 260 may be spaced apart from the mass 258 both longitudinally and transversely.

Referring specifically to FIG. 6, the resonator 200 may further include the amplitude limiter 204, which may limit the amplitude of the oscillating flexible membrane 202 by contacting the flexible membrane 202 and/or the mass damper 258. For example, when the flexible membrane 202 is oscillating between an outer position and an inner position, the mass damper 258 may contact a stopping surface 262 of the amplitude limiter 204. The amplitude limiter 204 may prevent the flexible membrane 202 and/or the mass damper 258 from moving vertically beyond the stopping surface 262. The amplitude limiter 204 may connect (or couple) to the outer body 206. Specifically, the amplitude limiter 204 may couple to the outer wall 210 of the outer body 206. The amplitude limiter 204 may extend along the axial centerline 250 from the outer wall 210 to the stopping surface 262. The amplitude limiter 204 may be positioned in the first chamber 220.

Referring now to FIG. 7, an enlarged cross-sectional view of the resonator 200 is illustrated in accordance with embodiments of the present disclosure. As shown, the outer body 206 may include the outer side walls 216 and the outer end walls 214 that extend generally vertically and the outer flange 212 that extends generally transversely and longitudinally from the outer end walls 214 and the side wells 216. The outer side walls 216 and the outer end walls 214 may define an outer interior surface 266 that extends generally vertically, and the outer flange 212 may define an inner surface 268 that extends generally longitudinally and transversely (e.g., perpendicularly to the outer interior surface 266). The inner surface 268 of the outer flange 212 may contact the outer surface 226 of the flexible membrane 202. A rounded corner surface 270 may be defined by the outer body 206 and extend between the outer interior surface 266 and the inner surface 268. Similarly, the inner body 208 may include the inner side walls 246 and the inner end walls 244 that extend generally vertically and the inner flange 242 that extends generally transversely and longitudinally from the inner end walls 244 and the inner side wells 246. The inner side walls 246 and the inner end walls 244 may define an inner interior surface 276 that extends generally vertically, and the inner flange 242 may define an outer surface 278 that extends generally longitudinally and transversely (e.g., perpendicularly to the inner interior surface 276). The outer surface 278 of the inner flange 212 may contact the inner surface 236 of the flexible membrane 202. A rounded corner surface 280 may be defined by the inner body 208 and extend between the inner interior surface 276 and the outer surface 278. The rounded corner surfaces 270, 280 may be arcuate, curved, or radiused (not including any sharp angle changes), which advantageously prevents tearing of the flexible membrane 202 when oscillating to dampen combustion dynamics.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A resonator for a combustor, the resonator comprising: an outer body partially defining a first chamber and one or more outer apertures configured to convey a first fluid between an outer fluid plenum and the first chamber; an inner body partially defining a second chamber and one or more inner apertures configured to convey a second fluid between the second chamber and a combustion chamber; and a flexible membrane disposed between the inner body and the outer body and partitioning the first chamber and the second chamber.

The resonator as in any preceding clause, wherein the flexible membrane is movable between an outermost position in the first chamber and an innermost position in the second chamber from a resting position between the inner body and the outer body.

The resonator as in any preceding clause, wherein the flexible membrane defines a thickness of between about 0.010 inches and about 0.125 inches.

The resonator as in any preceding clause, wherein the outer body and an outer surface of the flexible membrane collectively define the first chamber, and wherein the inner body and an inner surface of the flexible membrane collectively define the second chamber.

The resonator as in any preceding clause, wherein a mass damper is coupled to the flexible membrane.

The resonator as in any preceding clause, wherein the flexible membrane defines one or more openings that fluidly couple the first chamber and the second chamber.

The resonator as in any preceding clause, wherein the outer body includes an outer wall, an outer flange, and at least one outer side wall extending between the outer wall and the outer flange, and wherein the inner body includes an inner wall, an inner flange, and at least one inner side wall extending between the inner wall and the inner flange.

The resonator as in any preceding clause, wherein the flexible membrane is disposed between the inner flange and the outer flange.

The resonator as in any preceding clause, wherein the one or more outer apertures are defined in the outer wall of the outer body, and wherein the one or more inner apertures are defined in the inner wall of the inner body.

The resonator as in any preceding clause, wherein the at least one inner side wall defines one or more side apertures.

The resonator as in any preceding clause, further comprising an amplitude limiter coupled to the outer body.

A combustor comprising: a combustion liner defining a combustion chamber; an outer sleeve spaced apart from the combustion chamber such that an annulus is positioned between the outer sleeve and the combustion chamber; and one or more resonators positioned in the annulus and fluidly connected to the combustion chamber; wherein at least one of the one or more resonators comprises: an outer body partially defining a first chamber and one or more outer apertures configured to convey a first fluid between an outer fluid plenum and the first chamber; an inner body partially defining a second chamber and one or more inner apertures configured to convey a second fluid between the second chamber and a combustion chamber; and a flexible membrane disposed between the inner body and the outer body and partitioning the first chamber and the second chamber.

The combustor as in any preceding clause, wherein the flexible membrane is movable between an outermost position in the first chamber and an innermost position in the second chamber from a resting position between the inner body and the outer body.

The combustor as in any preceding clause, wherein the flexible membrane defines a thickness of between about 0.010 inches and about 0.125 inches.

The combustor as in any preceding clause, wherein the outer body and an outer surface of the flexible membrane collectively define the first chamber, and wherein the inner body and an inner surface of the flexible membrane collectively define the second chamber.

The combustor as in any preceding clause, wherein a mass damper is coupled to the flexible membrane.

The combustor as in any preceding clause, wherein the flexible membrane defines one or more openings that fluidly couple the first chamber and the second chamber.

The combustor as in any preceding clause, wherein the outer body includes an outer wall, an outer flange, and at least one outer side wall extending between the outer wall and the outer flange, and wherein the inner body includes an inner wall, an inner flange, and at least one inner side wall extending between the inner wall and the inner flange.

The combustor as in any preceding clause, wherein the flexible membrane is disposed between the inner flange and the outer flange.

The combustor as in any preceding clause, wherein the one or more outer apertures are defined in the outer wall of the outer body, and wherein the one or more inner apertures are defined in the inner wall of the inner body.

What is claimed is:

1. A resonator for a combustor, the resonator comprising:

an outer portion partially defining a first chamber and one or more outer apertures configured to convey a first fluid between an outer fluid plenum and the first chamber, wherein the outer portion includes an outer rounded corner surface;

an inner portion partially defining a second chamber and one or more inner apertures configured to convey a second fluid between the second chamber and a combustion chamber, wherein the inner portion includes an inner rounded corner surface; and a flexible membrane disposed between the inner rounded corner surface and the outer rounded corner surface and partitioning the first chamber and the second chamber.

2. The resonator as in claim 1, wherein the flexible membrane is movable between an outermost position in the first chamber and an innermost position in the second chamber from a resting position between the inner portion and the outer portion.

3. The resonator as in claim 1, wherein the flexible membrane defines a thickness of between about 0.010 inches and about 0.125 inches.

4. The resonator as in claim 1, wherein the outer portion and an outer surface of the flexible membrane collectively define the first chamber, and wherein the inner portion and an inner surface of the flexible membrane collectively define the second chamber.

5. The resonator as in claim 1, wherein a mass damper is coupled to the flexible membrane.

6. The resonator as in claim 1, wherein the flexible membrane defines one or more openings that fluidly couple the first chamber and the second chamber.

7. The resonator as in claim 1, wherein the outer portion includes an outer wall, an outer flange, and at least one outer side wall extending between the outer wall and the outer flange, and wherein the inner portion includes an inner wall, an inner flange, and at least one inner side wall extending between the inner wall and the inner flange.

8. The resonator as in claim 7, wherein the flexible membrane is disposed between the inner flange and the outer flange.

9. The resonator as in claim 7, wherein the one or more outer apertures are defined in the outer wall of the outer portion, and wherein the one or more inner apertures are defined in the inner wall of the inner portion.

10. The resonator as in claim 7, wherein the at least one inner side wall defines one or more side apertures.

11. The resonator as in claim 1, further comprising an amplitude limiter coupled to the outer portion.

12. A combustor comprising:

a combustion liner defining a combustion chamber;

an outer sleeve spaced apart from the combustion chamber such that an annulus is positioned between the outer sleeve and the combustion chamber; and one or more resonators positioned in the annulus and fluidly connected to the combustion chamber; wherein at least one of the one or more resonators comprises:

an outer portion partially defining a first chamber and one or more outer apertures configured to convey a first fluid between an outer fluid plenum and the first chamber, wherein the outer portion includes an outer rounded corner surface;

an inner portion partially defining a second chamber and one or more inner apertures configured to convey a second fluid between the second chamber and the combustion chamber, wherein the inner portion includes an inner rounded corner surface; and a flexible membrane disposed between inner rounded corner surface and the outer rounded corner surface and partitioning the first chamber and the second chamber.

13. The combustor as in claim 12, wherein the flexible membrane is movable between an outermost position in the first chamber and an innermost position in the second chamber from a resting position between the inner portion and the outer portion.

14. The combustor as in claim 12, wherein the flexible membrane defines a thickness of between about 0.010 inches and about 0.125 inches.

15. The combustor as in claim 12, wherein the outer portion and an outer surface of the flexible membrane collectively define the first chamber, and wherein the inner portion and an inner surface of the flexible membrane collectively define the second chamber.

16. The combustor as in claim 12, wherein a mass damper is coupled to the flexible membrane.

17. The combustor as in claim 12, wherein the flexible membrane defines one or more openings that fluidly couple the first chamber and the second chamber.

18. The combustor as in claim 12, wherein the outer portion includes an outer wall, an outer flange, and at least one outer side wall extending between the outer wall and the outer flange, and wherein the inner portion includes an inner wall, an inner flange, and at least one inner side wall extending between the inner wall and the inner flange.

19. The combustor as in claim 18, wherein the flexible membrane is disposed between the inner flange and the outer flange.

20. A resonator for a combustor, the resonator comprising:

an outer portion partially defining a first chamber and one or more outer apertures configured to convey a first fluid between an outer fluid plenum and the first chamber;

an inner portion partially defining a second chamber and one or more inner apertures configured to convey a second fluid between the second chamber and a combustion chamber;

a flexible membrane disposed between the inner portion and the outer portion and partitioning the first chamber and the second chamber; and an amplitude limiter coupled to the outer portion.

* * * * *